(12) United States Patent
Ulloa et al.

(10) Patent No.: US 10,690,298 B2
(45) Date of Patent: *Jun. 23, 2020

(54) APPARATUS, SYSTEM AND METHOD FOR INSTALLING AN LED-BASED TRACK LIGHTING SYSTEM

(71) Applicant: LEDVANCE LLC, Wilmington, MA (US)

(72) Inventors: Fernando Ulloa, Beverly, MA (US); Valeriy Zolotykh, Abington, MA (US); Anil Jeswani, Acton, MA (US); Anu Mathew, Lynnfield, MA (US)

(73) Assignee: LEDVANCE LLC, Wilmington, MA (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/207,674

(22) Filed: Dec. 3, 2018

(65) Prior Publication Data

US 2019/0101249 A1 Apr. 4, 2019

Related U.S. Application Data

(63) Continuation of application No. 15/680,437, filed on Aug. 18, 2017.

(51) Int. Cl.
| | |
|---|---|
| *F21K 9/278* | (2016.01) |
| *F21V 23/00* | (2015.01) |
| *F21S 8/02* | (2006.01) |
| *F21V 21/35* | (2006.01) |
| *F21V 15/01* | (2006.01) |
| *F21V 23/02* | (2006.01) |
| *H01R 25/14* | (2006.01) |
| *F21Y 115/10* | (2016.01) |
| *F21Y 103/10* | (2016.01) |
| *H01R 13/70* | (2006.01) |
| *H05B 45/10* | (2020.01) |

(52) U.S. Cl.
CPC .............. *F21K 9/278* (2016.08); *F21S 8/026* (2013.01); *F21V 15/01* (2013.01); *F21V 21/35* (2013.01); *F21V 23/003* (2013.01); *F21V 23/023* (2013.01); *H01R 25/142* (2013.01); *F21Y 2103/10* (2016.08); *F21Y 2115/10* (2016.08); *H01R 13/701* (2013.01); *H05B 45/10* (2020.01)

(58) Field of Classification Search
CPC ........ F21K 9/278; F21V 23/003; F21V 21/35; F21V 15/01; F21S 8/026
See application file for complete search history.

(56) References Cited

U.S. PATENT DOCUMENTS

2019/0056073 A1* 2/2019 Ulloa ...................... F21K 9/278

* cited by examiner

*Primary Examiner* — Joseph L Williams
(74) *Attorney, Agent, or Firm* — Hayes Soloway (57) ABSTRACT

A system, method, and apparatus for retrofitting a fluorescent light fixture accommodating an LED-based lighting system. A track is electrically connected to the driver module. The track includes at least one electronic conductor that is connected along the length of the track. At least one track adapter may connect to the track, and the track adapter includes a locking mechanism that allows the track adapter to connect to the track at any location along the track and the track may be removed. The locking mechanism may permit the track adapter to be removable. At least one light engine module can connect to the track and may also be removable.

20 Claims, 9 Drawing Sheets

APPARATUS, SYSTEM AND METHOD FOR INSTALLING AN LED-BASED TRACK LIGHTING SYSTEM

CROSS-REFERENCE TO RELATED APPLICATIONS

This patent application is a Continuation and claims benefit and priority to U.S. patent application Ser. No. 15/680,437, titled "APPARATUS SYSTEM AND METHOD FOR RETROFITTING A FLUORESCENT LIGHT FIXTURE TO AN LED-BASED LIGHTING SYSTEM," filed on Aug. 18, 2017, which is herein incorporated by reference in its entirety

FIELD

The present disclosure generally relates to LED lighting fixtures and, more particularly, is related to retrofitting a fluorescent lamp fixture to accommodate an LED-based lighting system.

BACKGROUND

In the electric lighting industry, fluorescent lighting fixtures have been commonly used fixtures in various residential, commercial, and industrial buildings. However, these lighting fixtures generally have relatively poor electrical efficiency and provide a relatively poor light quality. Recently, light emitting diode (LED) based lighting systems have been popular choices in place of fluorescent lighting fixtures, as LED fixtures generally are more energy efficient, last longer, and provide high-quality light.

Replacing fluorescent lighting fixtures for LED-based lighting fixtures may be an extremely laborious and expensive endeavor. There generally may be limited options to change the light output or the light distribution without undue labor and expense in removing the old fluorescent based lighting fixture and adding a new LED lighting fixture. A better option for retrofitting a fluorescent light fixture to accommodate a LED based lighting system without undue expense and labor therefore is needed.

Thus, a heretofore unaddressed need exists in the industry to address the aforementioned deficiencies and inadequacies.

SUMMARY

In light of the foregoing, the present disclosure generally relates to a system, method, and apparatus for retrofitting a fluorescent light fixture to an LED-based lighting system. Generally, regarding the structure of the system, the system may include a driver module. A track may be electrically connected to the driver module, and the track may include at least one electronic conductor that may be disposed along a length of the track. At least one track adapter may be configured to connect to the track, and the track adapter may include a locking mechanism that allows the track adapter to removably connect to the track at any location along the track. At least one light engine module may removably connect to the track.

Generally, the method for retrofitting a lighting fixture to accommodate an LED-based lighting apparatus contains the step of: mounting a track to the lighting fixture. The track may include a first electrical conductor and a second electrical conductor located along the track. The method may include installing a driver module that may be in electrical communication with the first electrical conductor and the second electrical conductor. The method may include connecting a track adapter to the track. The track adapter may be in electrical communication with the first electrical conductor and the second electrical conductor of the track. The method may include connecting a light engine module to the track adapter. The method may include locking the track adapter to the track using a locking mechanism. The locking mechanism may be used to engage the track adapter and light engine to the track at a desired position along the track and then may be used to disengage the track adapter to remove the track adapter and light engine.

Generally, regarding the structure of the apparatus for retrofitting a lighting fixture to an LED-based lighting device, the apparatus may include a track that has a first electric conductor and a second electric conductor located along a length of the track. The track may be configured to be located within a troffer of the lighting fixture. The apparatus may include a light engine module. A track adapter may be connected to the track using a locking mechanism that can be unlocked so that the track adapter can later be removed or relocated. The track adapter may connect to the light engine module.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The present disclosure can be better understood with reference to the following drawings. The components of the drawing are not necessarily to scale, emphasis instead being placed upon clearly illustrating the principles of the present disclosure. Moreover, in the drawings, like referenced numbers designate corresponding parts throughout the several views.

DETAILED DESCRIPTION

The present disclosure generally relates to LED lighting fixtures and, more particularly, is related to retrofitting fluorescent lighting fixtures to accommodate a LED-based lighting system. It should be noted that, while the following provides a series of examples of the LED lighting system and its components, other configurations may be utilized without departing from the scope of the claims.

Figure 1:
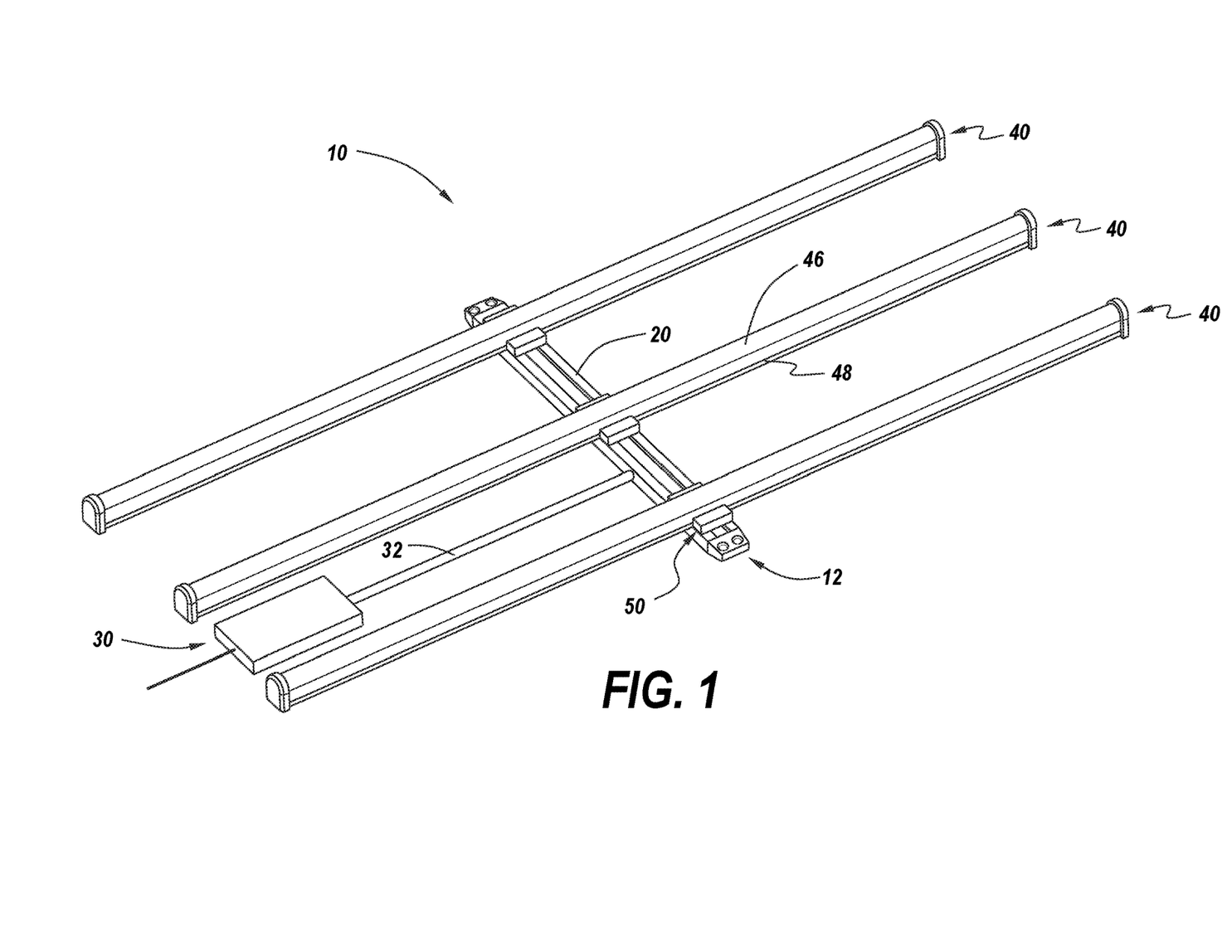
FIG. 1 is a perspective view of an LED-based lighting apparatus, in accordance with a first exemplary embodiment of the present disclosure.

FIG. 1 is a perspective view of an LED-based lighting apparatus 10, in accordance with a first exemplary embodiment of the present disclosure. The lighting apparatus 10 includes a track 20. The track 20 may include a mechanical fastener 12 for attaching the track 20 within a portion of a lighting fixture such as a troffer 14. Mechanical fasteners 12 can include screws, bolts, or another fastener known in the art.

As illustrated in FIG. 1, a driver module 30 is connected electrically to the track 20. The driver module 30 may include or be housed in a junction box. The driver module 30 may provide electricity to the track 20. The driver module 30 may be integral to or located in close proximity to the track 20, but may also be located remotely and may provide power to the system 10 via a cable 32 or a system of cables or wires. The driver module 30 may be configured to deliver direct current (DC) to the track 20.

The driver module 30 may include a transformer and other electrical circuitry to transform an alternating current power source into a low-voltage direct current using known methods. The transformer may be otherwise be located in electrical communication anywhere between the driver module 30 and the light engine module 40. An external power source (not shown) may be used to deliver electrical power to the driver module 30 using an external conductive cable (not shown). The driver module 30 may include a lighting control 38 such as a switch to control whether the driver module 30 provides power to the system 10. The lighting control 38 may be manual. The lighting control 38 may be wired or wirelessly connected to a network, using communications protocols such as Wi-Fi, Bluetooth, Ethernet, or any other known communications protocol.

The driver module 30 may include other controls such as controls for safety, circuit breakers, voltage regulators, surge protectors, or another control known in the art. The lighting control 38 may be located within the driver module 30. The lighting control may be located remotely from the driver module 30 and be electrically connected to the driver module 30 using a cable or a system of cables. The driver module 30 may include a dimmer module that may comprise a dimming method such as phase cut dimming or 0-10 volt dimming. The dimmer module may be located within the driver module 30. The dimmer module may be located remotely from the driver module 30 and may be electrically connected to the driver module 30 using a cable or a system of cables.

The light engine module 40 may be connected to the track 20 at a desired position along the track 20 using a track adapter 50. The light engine module 40 may be electrically connected and mechanically connected to the track adapter 50. The track adapter 50 may mechanically and electrically engage to the light engine module 40 using locking mechanisms, pre-formed slots, or outward biasing to removably engage the light engine module 40 to the track adapter 50.

As illustrated in FIG. 1, multiple track adapters 50 (e.g., three track adapters 50 shown in FIG. 1) may be engaged to the track 20. The present disclosure contemplates using any number of track adapters 50 on the track 20 to achieve optimal lighting intensity and coverage for any lighting system. The lighting system 10 may accommodate retrofitting a wide variety of traditionally fluorescent-based lighting fixtures, including, but not limited to, 2 foot by 2 foot (2×2) and 2 foot by 4 foot (2×4) fixtures that include one lamp or multiple lamps within the light fixture troffers. One or more light engines of just under 2 feet or 4 feet may be utilized within the light fixture troffers.

The scalable design feature of the present disclosure may allow for one or more track adapters 50 to connect to the track 20 and place one or more light engine modules 40 in desired positions to accommodate a variety of lighting fixtures to provide optimal lighting quality and light distribution. The scalability of the track adapters 50 may allow for a user to retrofit a wide variety of fluorescent-based lighting fixtures to accommodate an LED-based lighting system without requiring a specific LED-based lighting system 10 for each specific lighting fixture conventional in the art. Rather, the user may use the track 20, light engine module 40, and track adapter 50 described herein, and may configure the components as desired to supply high quality light and optimal light distribution to the wide variety of fluorescent based lighting fixtures known in the art. The user may place track adapters 50 and light engine modules 40 to the track 20 as needed to provide optimal light distribution given the specific needs of the lighting fixture.

As illustrated in FIG. 1, the LED-based lighting system 10 of the present disclosure may be mounted to a lighting component such as a troffer (not shown). Mounting the lighting system 10 into a troffer used in a previous fluorescent based lighting fixture may be advantageous to a user because the system 10 does not require the complete destruction of the previous lighting fixture and reconstruction of a new LED-based lighting fixture. The user can save time and resources by keeping the central components of the previous lighting system, such as the troffer (not shown), when installing the new LED-based lighting system 10.

Figure 2A:
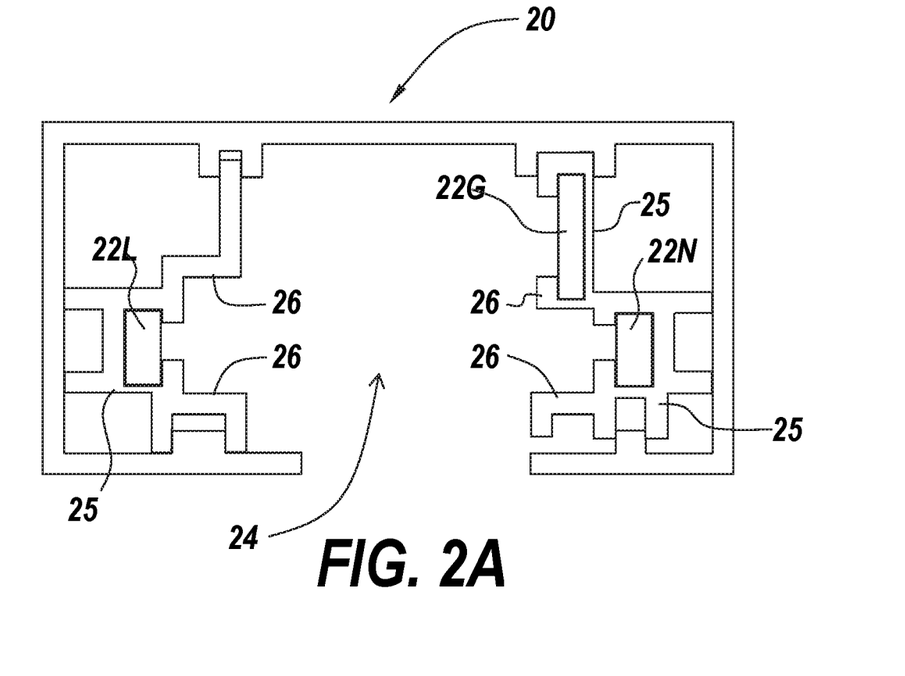
FIG. 2A is a cross-sectional view of the track for the LED-based lighting apparatus illustrated in FIG. 1, in accordance with a first exemplary embodiment of the present disclosure.

FIG. 2A is cross-sectional view of a first track design for the LED-based lighting apparatus 10 as illustrated in FIG. 1, in accordance with a first exemplary embodiment of the present disclosure. The track 20 may comprise a substantially elongated body. The track 20 may include at least one electrical conductor that may be used to conduct electricity. In FIG. 2, three electrical conductors 22L, 22N, 22G are illustrated. In this arrangement, the three conductors include a live conductor 22L, a neutral conductor 22N, and a ground conductor 22G. The track 20 may have one or more insulating members 25 in which to mount the conductors 22L, 22N, 22G and insulate other components of or exterior to the track 20 from the current conducted along the electrical conductors 22L, 22N, 22G. The electrical conductors 22L, 22N, 22G may be positioned along a desired length of the track 20 or may be positioned along the entire length of the track 20 and the electrical conductors 22L, 22N, 22G may be of different lengths. The electrical conductors 22L, 22N, 22G are positioned to deliver current to the track adapter 50 (illustrated in FIG. 1) as is explained and illustrated further herein.

As illustrated in FIG. 2, the track 20 may generally form a channel 24. The channel 24 may allow the track adapter 50 (illustrated in FIG. 1), when unlocked, to easily move or slide along the track 20 to be positioned for optimal light distribution. The track 20 may have mechanical engaging members 26 that allow for the track adapter 50 to engage and lock to the track 20 mechanically. While only one possible mechanical engagement technique is illustrated, any comparable mechanical engagement technique is contemplated and intended to be covered by the scope of the claims.

Figure 2B:
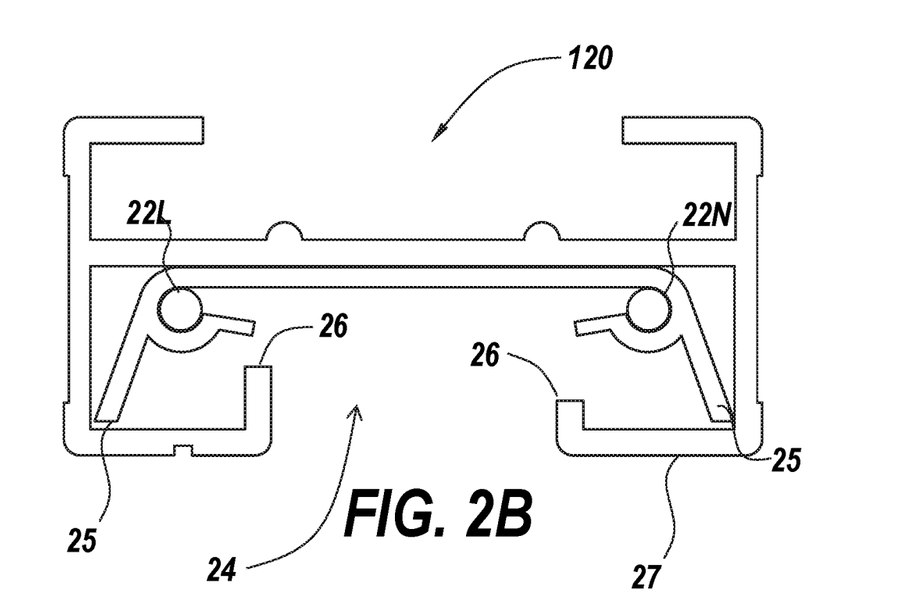
FIG. 2B is a cross-sectional view of a second track design for the LED-based lighting apparatus illustrated in FIG. 1, in accordance with a first exemplary embodiment of the present disclosure.

FIG. 2B is a cross-sectional view of a second track design for the LED-based lighting apparatus illustrated in FIG. 1, in accordance with a first exemplary embodiment of the present disclosure. The track 120 illustrated in FIG. 2B is similar to the track 20 in FIG. 2A. The track 120 includes the conductors 22L, 22N, the channel 24, the one or more insulating members 25 and the mechanical engaging members 26.

A difference between the first track design and second track design is that the second track design does not contain a ground (22G as illustrated in FIG. 2A). The first track design may also be adopted without a ground. Without a ground running some or all of the length of the track 120, an exterior frame 27 of the track 120 may be used as the electrical ground.

Figure 2C:
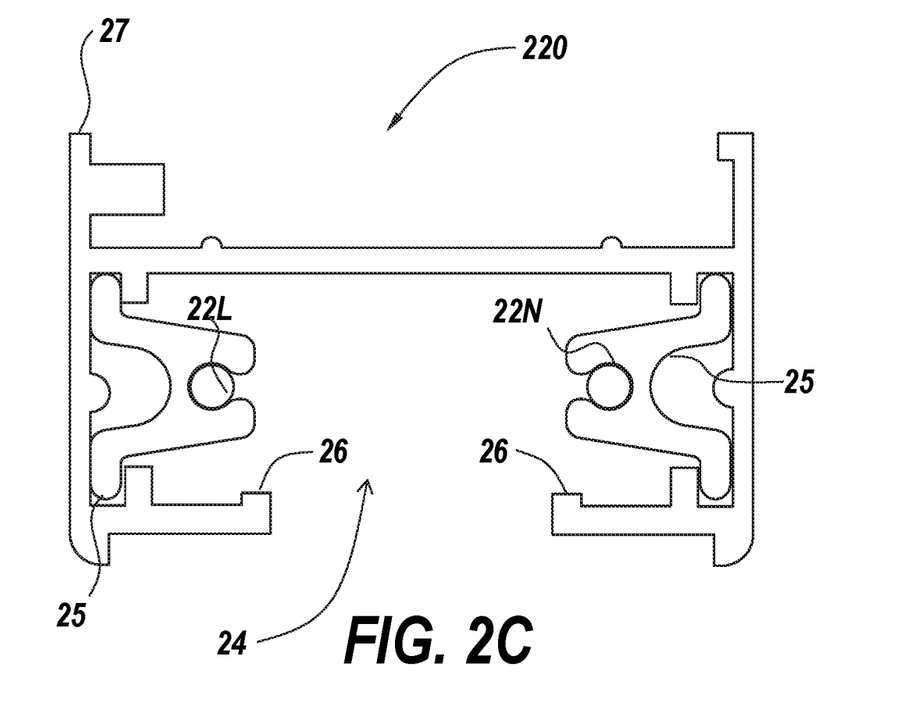
FIG. 2C is a cross-sectional view of a third track design for the LED-based lighting apparatus illustrated in FIG. 1, in accordance with a first exemplary embodiment of the present disclosure.

FIG. 2C is a cross-sectional view of a third track design for the LED-based lighting apparatus illustrated in FIG. 1, in accordance with a first exemplary embodiment of the present disclosure. The track 220 illustrated in FIG. 2C is similar to the track 20 in FIG. 2A and the track 120 in FIG. 2B. The track 220 includes the conductors 22L, 22N, the channel 24, the one or more insulating members 25 and the mechanical engaging members 26. As in the second track design, the exterior frame 27 may be used as the electrical ground. As can be seen comparing FIG. 2B and FIG. 2C, the one or more insulating members could be a monolithic structure or could be a plurality of structures. Other track 220 profiles are contemplated and within the scope of the present application.

Figure 3A:
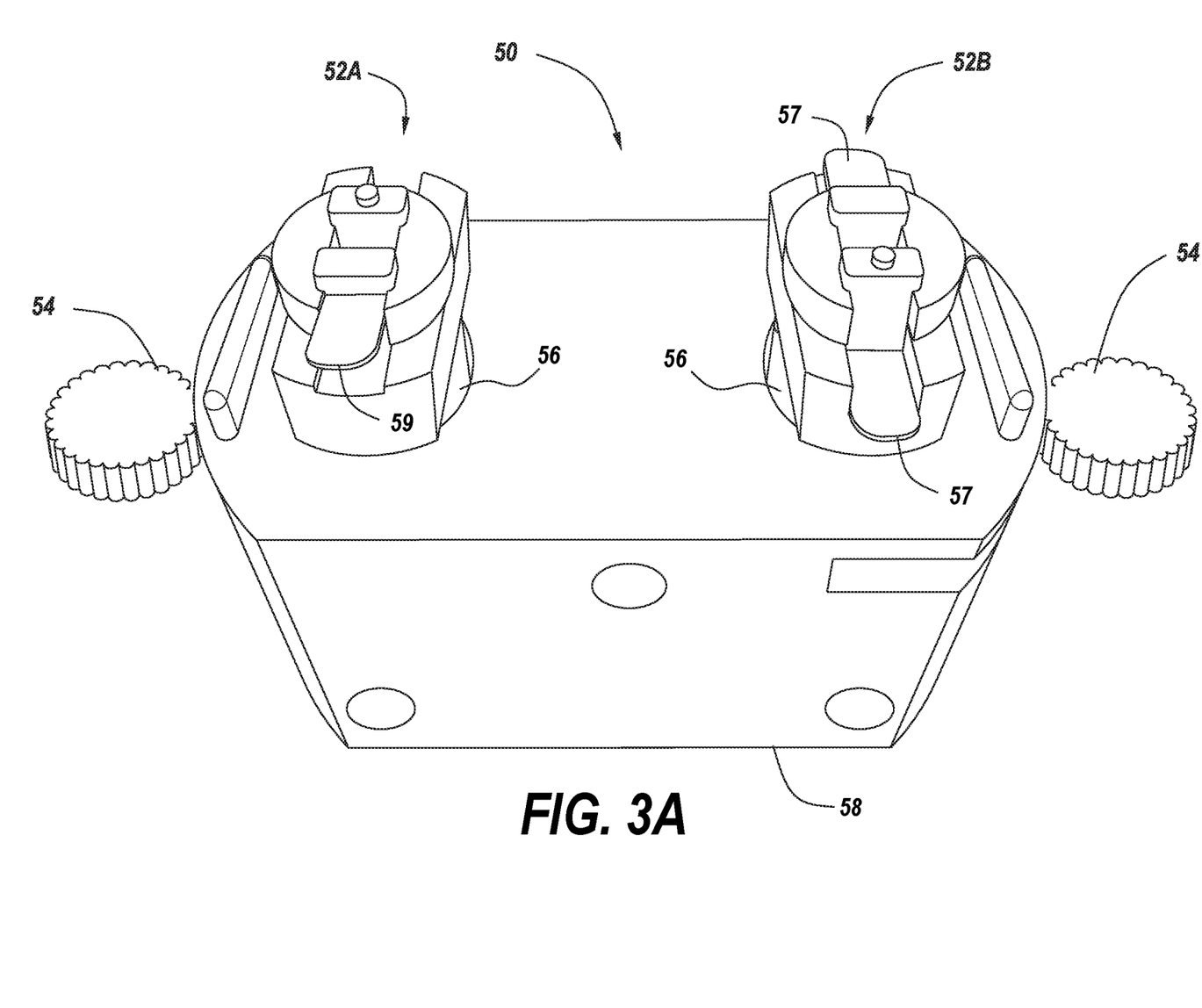
FIG. 3A is a perspective view of the track adapter for the LED-based lighting apparatus illustrated in FIG. 1, in accordance with the first exemplary embodiment of the present disclosure.

FIG. 3A is a perspective view of the track adapter 50 for the LED-based lighting apparatus illustrated in FIG. 1, in accordance with a first exemplary embodiment of the present disclosure. The track adapter 50 includes at least one engagement mount 52, which includes at least one electrical conductor configured to engage the track 20 electrically and a mechanical element to engage the track 20 mechanically. Two engagement mounts 52A, 52B are illustrated in FIG. 3A. Each engagement mount 52A, 52B includes a resilient member 56 and at least one electrical conductor 57, 59. The electrical conductors 57, 59 may extend from the engagement mounts 52A, 52B, with an electrical path therethrough and through a track adapter body 58 to deliver current to a light engine 40 (shown in FIG. 1).

The track adapter 50 may include at least one locking mechanism 54 extending from the track adapter body 58. The locking mechanism 54 may be configured to lock the track adapter 50 in place along a desired position of the track 20. The locking mechanism 54 may rotate engagement mounts 52A, 52B that frictionally lock at least one resilient member 56 to the track 20. The at least one resilient member 56 may provide a frictional and/or pressure fit with the mechanical engaging members 26 of the track 20 (shown in FIG. 2A-C). The locking mechanism 54 may utilize a latch or an outwardly biasing system for securing the resilient member 56.

Figure 3B:
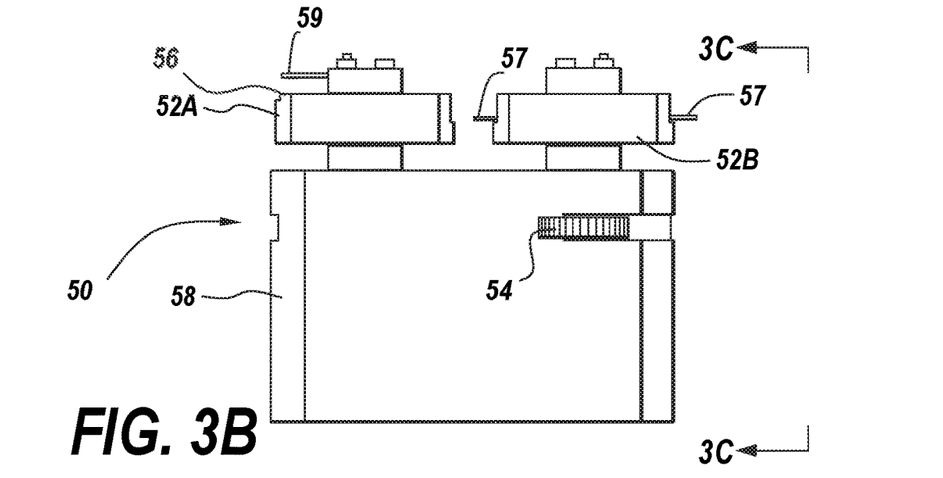
FIG. 3B is a front elevation view of the track adapter illustrated in FIG. 3A in an unlocked position, in accordance with the first exemplary embodiment of the present disclosure.

FIG. 3B is a front elevation view of the track adapter illustrated in FIG. 3A in an unlocked position, in accordance with the first exemplary embodiment of the present disclosure. It is observed that the track adapter 50 may have a locking mechanism 54 on both the left and right side of the track adapter body 58, wherein one locking mechanism controls a first engagement mount 52A and another locking mechanism controls a second engagement mount 52B. It is also contemplated that the track adapter 50 will have one locking mechanism that controls both engagement mounts 52 in concert. From this angle, the electrical conductors 57, 59 are more easily observed. The first engagement mount 52A has one conductor 59, which is mounted at a different elevation than the conductors 57 on the second engagement mount 52B. The first engagement mount 52A may electrically engage a grounded track conductor 22G, while the second engagement mount 52B may electrically engage a live track conductor 22L and a neutral track conductor 22N. For tracks 120, 220 that lack a grounded conductor 22G, the first engagement mount 52A may be constructed without any electrical conductor 59 or the track adapter 50 may be constructed with only one engagement mount 52B.

Figure 3C:
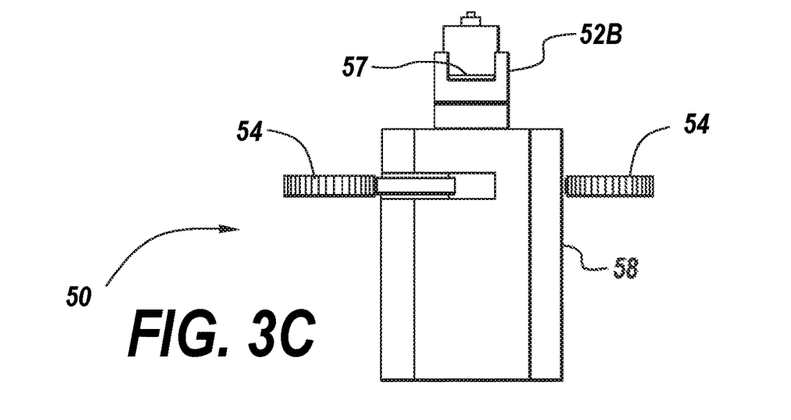
FIG. 3C is a right side view of the track adapter illustrated in FIG. 3A-B in an unlocked position, in accordance with the first exemplary embodiment of the present disclosure.

FIG. 3C is a right side view of the track adapter illustrated in FIG. 3A-B in an unlocked position, in accordance with the first exemplary embodiment of the present disclosure. The first engagement mount 52A and its conductor 59 are not shown in this angle because they are obstructed by the second engagement mount 52B.

Figure 3D:
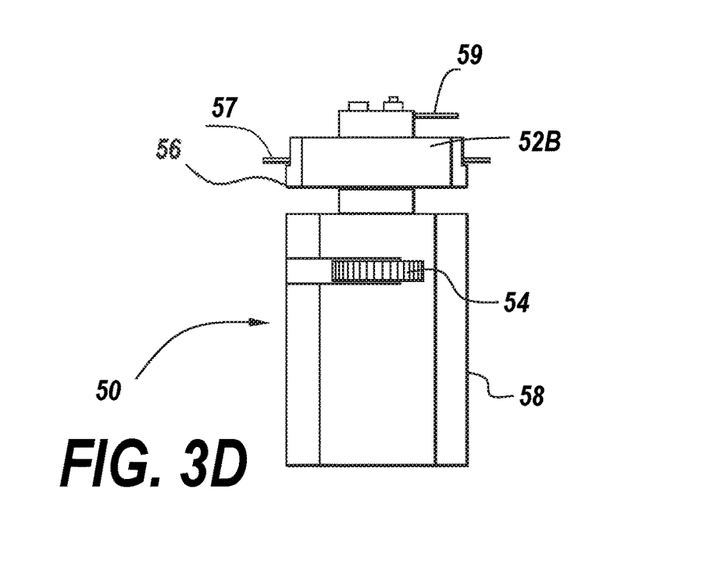
FIG. 3D is a right side view of the track adapter illustrated in FIG. 3A-C in a locked position, in accordance with the first exemplary embodiment of the present disclosure.

FIG. 3D is a right side view of the track adapter illustrated in FIG. 3A-C in a locked position, in accordance with the first exemplary embodiment of the present disclosure. The first engagement mount 52A is not shown in this angle because it is obstructed by the second engagement mount 52B, but the conductor 59 is visible. Comparing FIG. 3C and FIG. 3D, it is clear that the engagement mounts 52A, 52B have a wider profile in the locked position as compared to the unlocked position.

Figure 4A:
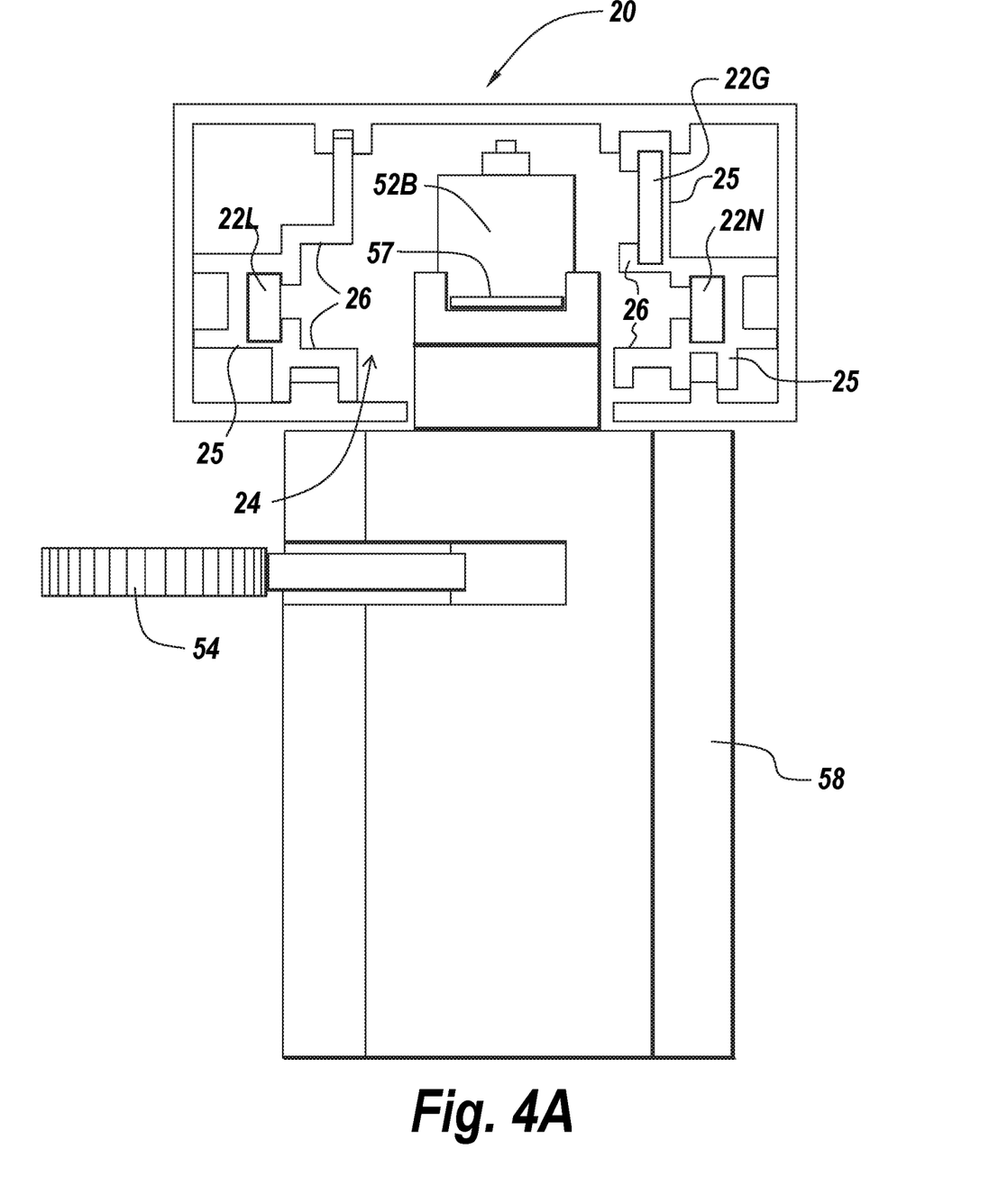
FIG. 4A is a right side view of the track adapter as illustrated in FIG. 3A-D in an unlocked position and positioned to engage the track illustrated in FIG. 2A, in accordance with the first exemplary embodiment of the present disclosure.

FIG. 4A is a right side view of the track adapter as illustrated in FIG. 3A-D in an unlocked position and positioned to engage the track illustrated in FIG. 2A, in accordance with the first exemplary embodiment of the present disclosure. The engagement mounts 52A, 52B are sufficiently narrow in the unlocked position to slide up into an opening in the lower side of the track 20 and into the channel 24. The locking mechanism 54 may be rotated from this position to cause the engagement mounts 52A, 52B to engage with the track 20.

Figure 4B:
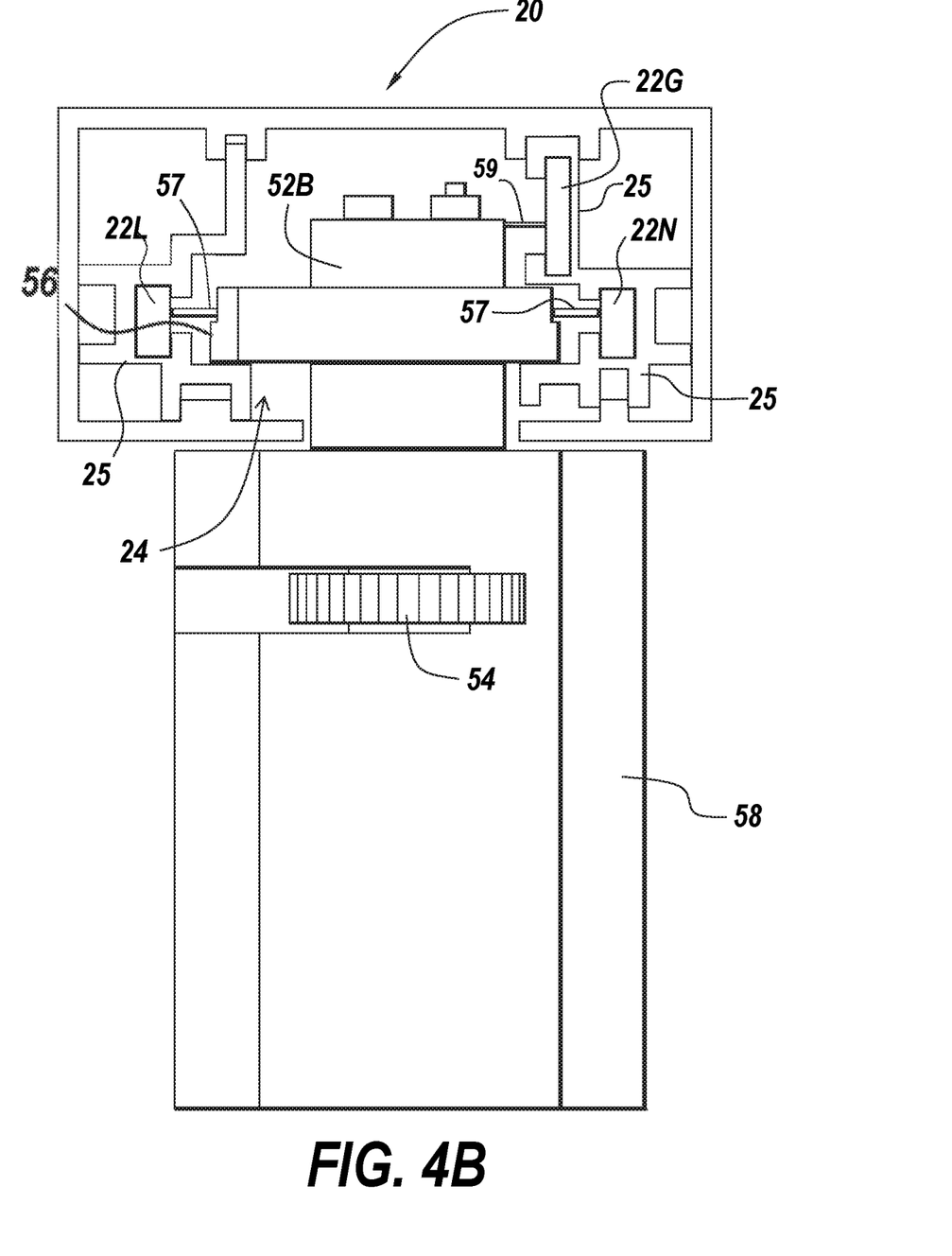
FIG. 4B is a right side view of the track adapter as illustrated in FIG. 3A-D in a locked position and engaged with the track illustrated in FIG. 2A, in accordance with the first exemplary embodiment of the present disclosure.

FIG. 4B is a right side view of the track adapter as illustrated in FIG. 3A-D in a locked position and engaged with the track illustrated in FIG. 2A, in accordance with the first exemplary embodiment of the present disclosure. In the engaged position, the resilient members 56 are engaged with the mechanical engaging members 26 and the adapter conductors 57, 59 are engaged with the track conductors 22L, 22N, 22G. The one or more insulating members 25 protect the track exterior 27 from the current of the conductors 22L, 22N, 22G. The track body 58 supports the light engine 40 (not shown).

The locking mechanism 54 may be configured to removably engage the resilient member 56 with the track 20, as to allow the resilient members 56 through manipulation of the locking mechanism 54 to disengage with the mechanical engaging members 26, to re-position and re-lock the track adapter 50 to any desired position along the track 20. The locking mechanism 54 may include a latch, lever, or slot for a user to disengage the resilient member 56 from the mechanical engaging members 26. The resilient member 56 and the electrical conductors 57, 59 may be positioned as desired to fit appropriately within the design of the track 20. The track adapter 50 may be designed to easily and removably install onto a track 20, thereby saving time, resources, and expense when installing the LED light fixture 10.

The track adapter 50, as shown in FIG. 4A and FIG. 4B, may include a cap that may be placed over the engagement mounts 52A, 52B to protect the conductors 57, 59 from damage when in the disengaged position. The cap 55 may be designed to fit into the channel 24 of the track 20 with at least one slot to permit engagement of the electrical conductors 57, 59 and the resilient members 56 when the engagement mounts 52A, 52B are rotated into the locked position.

Figure 5:
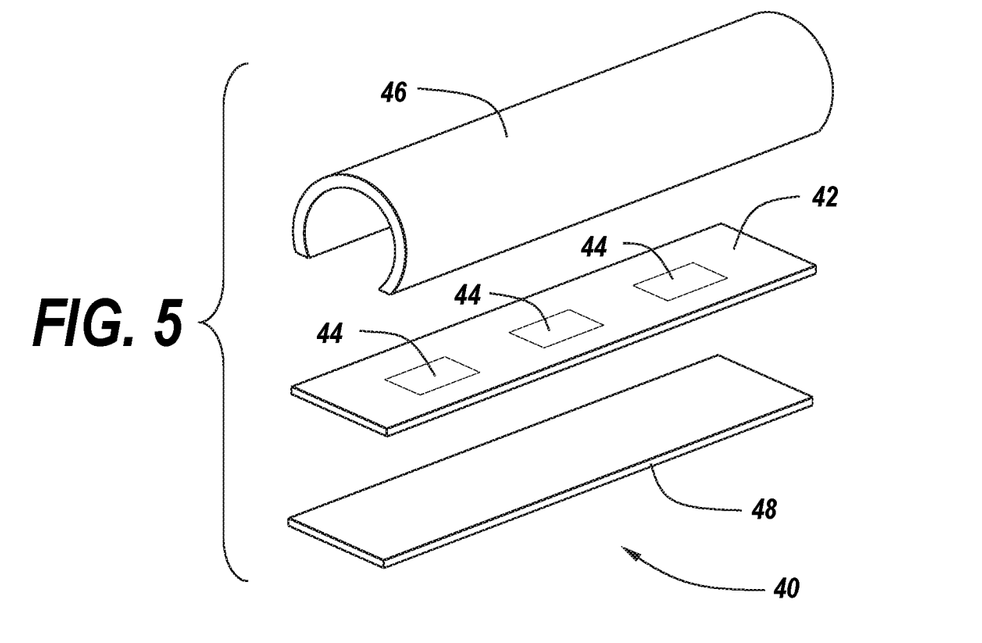
FIG. 5 is an exploded perspective view of the light engine module as illustrated in FIG. 1, in accordance with the first exemplary embodiment of the present disclosure.

FIG. 5 is an exploded perspective view of the light engine module 40. The light engine module 40 may include a circuit board 42 that may contain a plurality of LED's 44. The circuit board 42 may comprise a known printed circuit board (PCB) to provide electrical current to the plurality of LED's 44. The plurality of LED's 44 may be positioned in any given pattern or density on the circuit board 42 such that the light engine module 40 provides an optimal light intensity, provided the application and desired light intensity. The light engine module 40 may include track adapter engaging modules 48 configured mechanically and electrically to engage to the track adapter 50. The track adapter engaging modules 48 may include a conventional mechanical engaging method such as a latch or slot to engage to the track adapter 50. The track adapter engaging module 48 may include a conductive material to engage the light engine module 40 electrically to the track adapter 50. The light engine module 40 may include a cover 46 to protect the plurality of LED's 44 on the light engine module 40. The cover 46 may be made of a plastic, glass, or another clear material to protect the LED's 44 and adequately dissipate heat. The cover 46 may be permanently mounted to the circuit board 42 or may include a latch or slot to remove the cover when desired. The light engine module 40 may be at least two feet long and is generally no more than six inches wide, although the exact dimensions can differ depending on the application and desired light intensity and distribution.

The track adapter 50 may be integral with the light engine module 40 or may be configured to engage mechanically and electrically to the light engine module 40 or the track adapter engaging modules 48 in a manner known to those having ordinary skill in the art. In operation, a live current may travel from the driver module 30, along a conductor in the cable 32, to a track conductor 22L, through an adapter conductor 57, through the light engine engaging module 48, to the light engine module 40, back through the light engine module 48, through another adapter conductor 57, along another track conductor 22N, through another conductor in the cable 32, and back to the driver module 30.

Figure 6:
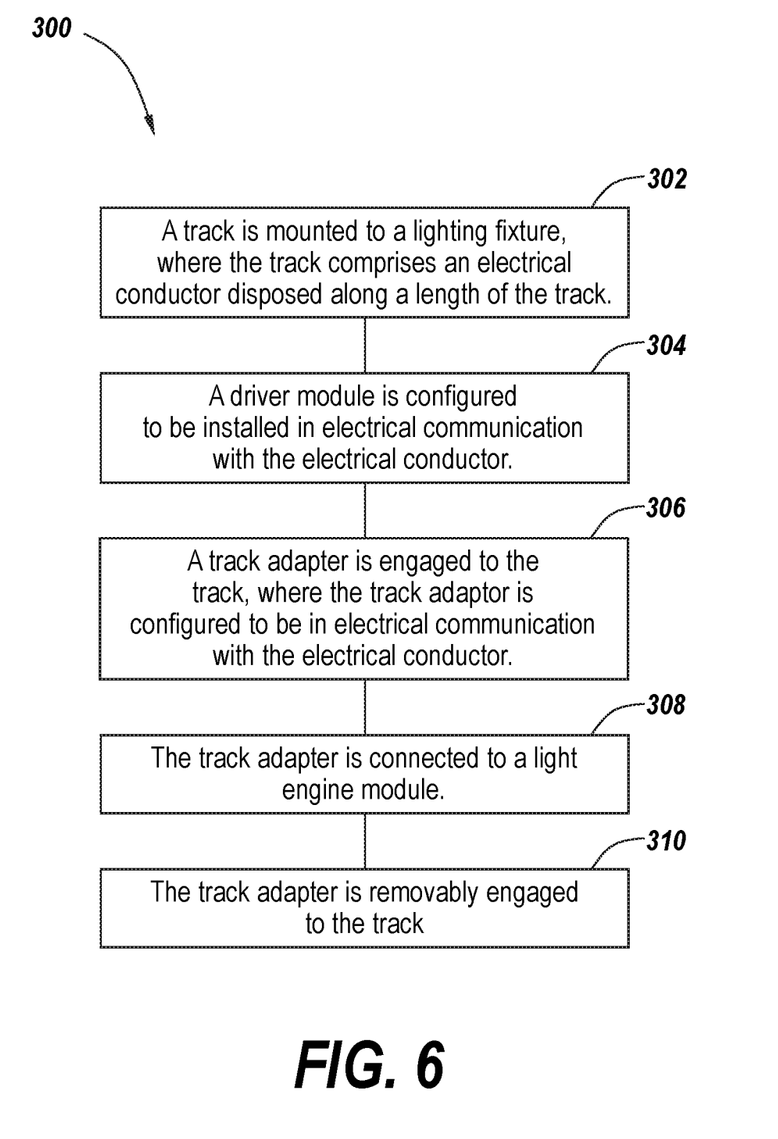
FIG. 6 is a flowchart illustrating a method for retrofitting a lighting fixture to accommodate an LED-based lighting apparatus, in accordance with the first exemplary embodiment of the present disclosure.

FIG. 6 is a flowchart 300 illustrating a method for retrofitting a lighting fixture to accommodate an LED-based lighting apparatus 10, in accordance with the first exemplary embodiment of the present disclosure. It should be noted that any alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown in block 302, a track 20 is mounted within a lighting fixture troffer, where the track 20 comprises at least one electrical conductor 22L, 22N disposed along a length of the track 20. A driver module 30 is configured to be installed in electrical communication with the electrical conductor 22L, 22N (block 304). A track adapter 50 is engaged to the track 20, where the track adapter 50 is configured to be in electrical communication with the electrical conductor 22L, 22N of the track 20 (block 306). The track adapter 50 is connected to a light engine module 40 (block 308). The track adapter 50 is locked to the track 20 using a locking mechanism 54, where the locking mechanism 54 is configured to removably engage the track adapter 50 to the track 20 at a position along the track 20 (block 310).

It should be emphasized that the above described embodiments of the present disclosure are merely some possible examples of implementations, set forth for a clear understanding of the principles of the disclosure. Many variations and modifications may be made to the above described embodiments of the disclosure without departing substantially from the spirit and principles of the disclosure. All such modifications and variations are intended to be included herein within the scope of this disclosure and the present disclosure, and protected by the following claims.

What is claimed is:

1. An LED-based lighting system, comprising:
   a driver module;
   a track electrically connected to the driver module, wherein the track comprises at least one electronic conductor disposed along a length of the track; and
   at least one track adapter removably connected to the track, wherein the at least one track adapter comprises a locking mechanism configured to engage removably with the track at a position along the track,
   wherein each of the track adapters is configured to be removably engaged with at least one light engine module.

2. The system of claim 1, wherein the at least one track adapter is mechanically and electrically engaged to the least one light engine module.

3. The system of claim 1, wherein the locking mechanism comprises at least one resilient member configured to removably wedge against the track to secure the at least one track adapter to the track.

4. The system of claim 1, further comprising at least one mechanical fastener to secure the track in a fixed position.

5. The system of claim 1, wherein the driver module further comprises a lighting control disposed within the driver module, wherein the lighting control module is electrically connected to the driver module.

6. The system of claim 1, wherein the driver module comprises a dimming module.

7. The system of claim 1, wherein the track is configured to engage with at least a first light engine module and a second light engine module using a first track adapter and a second track adapter.

8. The system of claim 1, wherein the light engine module is at least two feet long and less than six inches wide.

9. A method for installing an LED-based track lighting apparatus, the method comprising:

mounting a track in a fixed position, wherein the track comprises at least one electrical conductor disposed along a length of the track;

installing a driver module configured to be in electrical communication with the electrical conductor;

engaging a track adapter with the track, wherein the track adapter is configured to be in electrical communication with the electrical conductor; and locking the track adapter to the track using a locking mechanism, wherein the locking mechanism is configured to removably engage the track adapter to the track at a desired position along the track.

10. The method of claim 9, further comprising connecting a light engine module to the track adapter.

11. The method of claim 10, wherein the track adapter mechanically and electrically engages to the light engine module.

12. The method of claim 9, wherein the track adapter further comprises at least one electronic connector configured to electronically engage to the track.

13. The method of claim 9, wherein the locking mechanism comprises at least one resilient member configured to removably wedge against the track for securing the track adapter to the track.

14. An apparatus, comprising:
a track, wherein the track comprises a first electric conductor and a second electric conductor disposed along a length of the track;
a light engine module; and
a track adapter engaged removably to the track using a locking mechanism, wherein the track adapter is configured to connect to the light engine module.

15. The apparatus of claim 14, wherein the locking mechanism is configured to frictionally lock the track adapter to the track at any desired position along the track.

16. The apparatus of claim 14, wherein the track adapter further comprises a locking mechanism comprising at least one resilient member configured to removably wedge against the track to secure the track adapter to the track.

17. The apparatus of claim 14, wherein the track is configured to engage with at least a first light engine module and a second light engine module using a first track adapter and a second track adapter.

18. The apparatus of claim 14, further comprising a driver module in electrical communication with the track.

19. The apparatus of claim 18, wherein the driver module further comprises a lighting control module.

20. The apparatus of claim 18, wherein the driver module further comprises a dimming module.

\* \* \* \* \*